(12) United States Patent
Redmond et al.

(10) Patent No.: US 12,433,644 B2
(45) Date of Patent: Oct. 7, 2025

(54) MULTIAXIAL RECEIVERS WITH TETHER

(71) Applicant: Warsaw Orthopedic, Inc., Warsaw, IN (US)

(72) Inventors: Jerald Redmond, Germantown, TN (US); Larry McBride, Germantown, TN (US); Dimitri Protopsaltis, Memphis, TN (US); Mike Sherman, Memphis, TN (US); Chris Italiaie, Playa Del Rey, CA (US); Alan Rezach, Covington, TN (US); Lawrence G. Lenke, New York, NY (US)

(73) Assignee: WARSAW ORTHOPEDIC, INC., Warsaw, IN (US)

( * ) Notice: Subject to any disclaimer, the term of this patent is extended or adjusted under 35 U.S.C. 154(b) by 408 days.

(21) Appl. No.: 17/989,302

(22) Filed: Nov. 17, 2022

(65) Prior Publication Data
US 2024/0164814 A1    May 23, 2024

(51) Int. Cl.
*A61B 17/70* (2006.01)
*A61B 17/86* (2006.01)

(52) U.S. Cl.
CPC ...... *A61B 17/7032* (2013.01); *A61B 17/8605* (2013.01)

(58) Field of Classification Search
CPC ............ A61B 17/7032; A61B 17/8605; A61B 17/7053
See application file for complete search history.

(56) References Cited

U.S. PATENT DOCUMENTS

| | | | |
|---|---|---|---|
| 5,180,393 A | 1/1993 | Commarmond | |
| 5,425,767 A | 6/1995 | Steininger et al. | |
| 6,328,739 B1 * | 12/2001 | Liu | A61B 17/7041 606/264 |
| 6,551,320 B2 | 4/2003 | Lieberman | |
| 6,576,017 B2 | 6/2003 | Foley et al. | |
| 7,625,394 B2 * | 12/2009 | Molz, IV | A61B 17/7037 606/279 |
| 7,942,902 B2 * | 5/2011 | Schwab | A61B 17/7001 606/252 |
| 8,034,083 B2 | 10/2011 | Abdelgany et al. | |
| 8,070,785 B2 | 12/2011 | Biscup | |

(Continued)

FOREIGN PATENT DOCUMENTS

WO     2016166448 A    10/2016

*Primary Examiner* — Zade Coley
(74) *Attorney, Agent, or Firm* — FOX ROTHSCHILD LLP

(57) ABSTRACT

Various multiaxial receivers for receiving at least one tether are disclosed. A multiaxial receiver may include a body having a U-shaped cavity configured to receive a longitudinal rod therein and a lower cavity configured to couple to a pedicle screw. The body may include a first aperture extending through a side surface of the body and defining a first passageway configured to permit a tether to pass therethrough in the horizontal direction. In some embodiments, the body may include a second aperture extending through the side surface of the body and defining a second passageway configured to permit the tether to pass therethrough in the horizontal direction. A set screw may be configured to be rotated from an open position in which the tether is permitted to pass through the first passageway and optionally through the second passageway to a closed position in which the tether is immobilized.

16 Claims, 19 Drawing Sheets

(56) References Cited

U.S. PATENT DOCUMENTS

| | | | |
|---|---|---|---|
| 8,480,713 B2* | 7/2013 | Rezach | A61B 17/7041 606/246 |
| 8,641,736 B2* | 2/2014 | Marik | A61B 17/7022 606/254 |
| 8,888,819 B2* | 11/2014 | Frasier | A61B 17/701 606/264 |
| 8,979,901 B2* | 3/2015 | Trieu | A61B 17/7046 606/264 |
| 9,039,708 B2 | 5/2015 | Larroque-Lahitette | |
| 9,113,966 B2 | 8/2015 | Baccelli et al. | |
| 9,144,440 B2 | 9/2015 | Aminian | |
| 9,615,867 B2* | 4/2017 | Picetti | A61B 17/7044 |
| 9,770,268 B2 | 9/2017 | Albert et al. | |
| 10,238,432 B2* | 3/2019 | Carruth | A61B 17/8685 |
| 10,568,674 B1 | 2/2020 | Eichenseer | |
| 10,595,904 B2 | 3/2020 | Albert et al. | |
| 10,603,077 B2* | 3/2020 | Zhang | A61B 17/701 |
| 10,758,274 B1 | 9/2020 | Bess et al. | |
| 10,869,695 B2* | 12/2020 | Carruth | A61B 17/866 |
| 11,026,722 B2 | 6/2021 | Albert et al. | |
| 11,185,353 B2 | 11/2021 | Prygoski et al. | |
| 11,207,107 B2 | 12/2021 | Mickiewicz et al. | |
| 11,246,630 B2 | 2/2022 | Akbarnia et al. | |
| 11,382,676 B2* | 7/2022 | Lee | A61B 17/8615 |
| 11,877,775 B1* | 1/2024 | Redmond | A61B 17/7032 |
| 2004/0111088 A1* | 6/2004 | Picetti | A61B 17/7001 606/279 |
| 2004/0254574 A1 | 12/2004 | Morrison et al. | |
| 2006/0241595 A1* | 10/2006 | Molz, IV | A61B 17/7038 606/328 |
| 2007/0270817 A1* | 11/2007 | Rezach | A61B 17/7049 606/252 |
| 2007/0270832 A1* | 11/2007 | Moore | A61B 17/7037 606/278 |
| 2008/0058818 A1 | 3/2008 | Schwab | |
| 2008/0154308 A1* | 6/2008 | Sherman | A61B 17/7037 606/305 |
| 2008/0249570 A1* | 10/2008 | Carson | A61B 17/7038 606/301 |
| 2008/0269810 A1* | 10/2008 | Zhang | A61B 17/7034 606/301 |
| 2009/0131982 A1* | 5/2009 | Schwab | A61B 17/7001 606/279 |
| 2009/0275986 A1* | 11/2009 | Prevost | A61B 17/7031 606/264 |
| 2011/0022093 A1* | 1/2011 | Sherman | A61B 17/7089 606/279 |
| 2012/0029566 A1* | 2/2012 | Rezach | A61B 17/7038 606/264 |
| 2012/0150232 A1* | 6/2012 | Van Nortwick | A61B 17/7001 606/264 |
| 2012/0197312 A1* | 8/2012 | Rezach | A61B 17/7032 606/305 |
| 2012/0303062 A1* | 11/2012 | Amstutz | A61B 17/7002 606/267 |
| 2013/0274808 A1* | 10/2013 | Larroque-Lahitette | A61B 17/7037 29/525.11 |
| 2014/0018858 A1* | 1/2014 | Laeng | A61B 17/7041 606/267 |
| 2014/0094850 A1 | 4/2014 | Clement et al. | |
| 2014/0257397 A1 | 9/2014 | Akbarnia | |
| 2016/0166289 A1* | 6/2016 | Alsup | A61B 17/70 606/253 |
| 2016/0235447 A1 | 8/2016 | Mundis, Jr. et al. | |
| 2016/0324547 A1* | 11/2016 | Miller | A61B 17/7032 |
| 2017/0086895 A1* | 3/2017 | Barra | A61B 17/8605 |
| 2017/0333088 A1* | 11/2017 | Lee | A61B 17/8645 |
| 2018/0078286 A1 | 3/2018 | Le Couedic | |
| 2018/0132905 A1 | 5/2018 | Le Couëdic et al. | |
| 2018/0228518 A1* | 8/2018 | Carruth | A61B 17/7001 |
| 2019/0175226 A1* | 6/2019 | Carruth | A61B 17/7001 |
| 2021/0121204 A1* | 4/2021 | Murray | A61B 17/7032 |
| 2021/0145486 A1 | 5/2021 | Mosnier et al. | |
| 2021/0322059 A1 | 10/2021 | Eichenseer | |
| 2022/0104853 A1 | 4/2022 | Murray et al. | |
| 2022/0151662 A1 | 5/2022 | Murray | |

* cited by examiner

100

MULTIAXIAL RECEIVERS WITH TETHER

FIELD

The present technology is generally related to implants that may be used in spinal fixation surgery. More particularly, the disclosure herein may be directed to implants and implant systems having apertures for passing of a tether, ligature, and/or artificial ligament tape to further stabilize and support the implant and patient anatomy. Disclosed implants may be multiaxial receivers that may pop on to a bone screw or a pedicle screw. Additionally, various implants may have at least one aperture for passing of a tether therethrough and an immobilization means to secure the tether to the implant.

BACKGROUND

There are a variety of structures and methods for treating one or more degenerated, deformed or damaged vertebral stages of a patient's spinal column by means of internal spinal fixation. Typically, this involves the attachment of a spinal implant system to provide a construct that is attached to two or more adjacent vertebrae to support and stabilize the vertebrae to allow them to fuse together in a stationary relationship relative to each other. Spinal fusion constructs typically include pedicle screws and longitudinal support members or rods that are attached to the pedicle screws and together they may fix the position of the adjacent vertebrae to which they are attached.

The related art teaches various anchoring devices that are attached to a construct and allow the surgeon to fasten a tether and/or ligament tape to the construct. However, these specialized anchoring devices result in a construct that adds them as one or more additional devices that must be included in the construct. The additional devices increase the space occupied by the construct, require additional manipulation by the surgeon. Additionally, these constructs are typically uniaxial, have a relatively high height, and therefore do not provide adequate adjustability for a surgeon.

The term "tether" is used in a generic sense to refer to a type of cordage that is available for surgeons to perform various procedures for use with disclosed implant embodiments. The related art may refer to equivalent structures as tape, cable, rope, ligature, wire, braid, band, or strand. Typically, these structures may be elongated structures that are flexible so that they bend easily (with the application of relatively little force) but also have a strong resistance to being stretched longitudinally by a substantial pulling force. For example, these structures have a relatively high tensile strength and relatively low compressive strength.

SUMMARY

This disclosure generally relates to multiaxial receivers for performing a surgery to a spinal column of a patient. Various multiaxial receivers may have at least one aperture for receiving a tether therein and the tether may be wrapped around various portions of a vertebrae (pedicle, lamina, spinous process, etc.) to further stabilize the patient's spinal column.

In one aspect, the present disclosure provides for a multiaxial receiver including a body having a U-shaped cavity configured to receive a longitudinal rod therein and a lower cavity configured to couple to a pedicle screw. In various embodiments, the body may extend in a vertical direction along a longitudinal axis and extend in a horizontal direction along a widthwise axis. In various embodiments, the body may include a side portion having a first aperture extending through a side surface thereof and defining a first passageway configured to permit a tether to pass therethrough in the horizontal direction. In various embodiments, the body may include a threaded aperture extending through the upper surface and into the first passageway and a set screw may be disposed in the threaded aperture. In various embodiments, the set screw is configured to be rotated from an open position in which the tether is permitted to pass through the first passageway to a closed position in which the tether is immobilized within the first passageway.

In another aspect, the disclosure provides for a multiaxial receiver including a body having a U-shaped cavity configured to receive a longitudinal rod therein and a lower cavity configured to couple to a pedicle screw. In various embodiments, the body may extend in a vertical direction along a longitudinal axis and extend in a horizontal direction along a widthwise axis. The body may include a side portion having a first aperture extending through a side surface thereof and defining a first passageway configured to permit a tether to pass therethrough in the horizontal direction, and at least one ferrule may be disposed in the first passageway. In various embodiments, the first ferrule may be configured to be crimped from an open position in which the tether is permitted to pass through the first passageway to a closed position in which the ferrule is collapsed and the tether is immobilized within the first passageway.

In another aspect, the disclosure provides for a multiaxial receiver including a body having a U-shaped cavity configured to receive a longitudinal rod therein and a lower cavity configured to couple to a pedicle screw. In various embodiments, the body may extend in a vertical direction along a longitudinal axis and extend in a horizontal direction along a widthwise axis. The body may include a first aperture extending through a side surface of the body and defining a first passageway configured to permit a tether to pass therethrough in the horizontal direction, and a second aperture extending through the side surface of the body and defining a second passageway configured to permit the tether to pass therethrough in the horizontal direction. The body may include a threaded aperture extending through an upper surface of the body and into the first passageway and second passageway, and a set screw may be disposed in the threaded aperture. In various embodiments, the set screw may be configured to be rotated from an open position in which the tether is permitted to pass through the first passageway and optionally through the second passageway to a closed position in which the tether is immobilized within the first passageway and/or second passageway.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
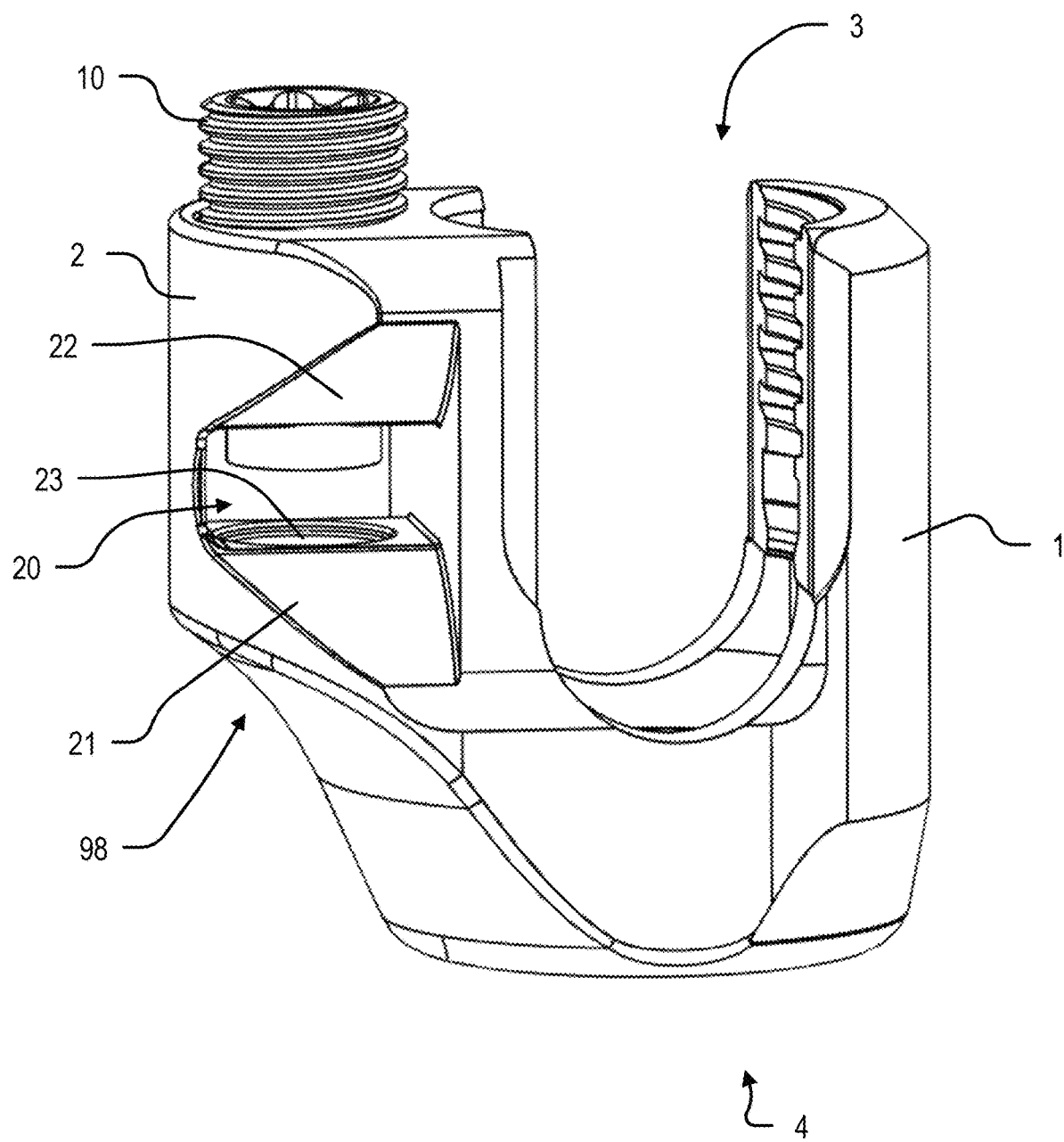
FIG. 1 is a first perspective view of a first multiaxial receiver embodiment.

Embodiments of the present disclosure relate generally, for example, to spinal stabilization systems, and more particularly, to surgical instruments for use with spinal stabilization systems. Embodiments of the devices and methods are described below with reference to the Figures.

The following discussion omits or only briefly describes certain components, features and functionality related to medical implants, installation tools, and associated surgical techniques, which are apparent to those of ordinary skill in the art. It is noted that various embodiments are described in detail with reference to the drawings, in which like reference numerals represent like parts and assemblies throughout the several views, where possible. Reference to various embodiments does not limit the scope of the claims appended hereto because the embodiments are examples of the inventive concepts described herein. Additionally, any example(s) set forth in this specification are intended to be non-limiting and set forth some of the many possible embodiments applicable to the appended claims. Further, particular features described herein can be used in combination with other described features in each of the various possible combinations and permutations unless the context or other statements clearly indicate otherwise.

Terms such as "same," "equal," "planar," "coplanar," "parallel," "perpendicular," etc. as used herein are intended to encompass a meaning of exactly the same while also including variations that may occur, for example, due to manufacturing processes or methods of assembly or installation. The term "substantially" may be used herein to emphasize this meaning, particularly when the described embodiment has the same or nearly the same functionality or characteristic, unless the context or other statements clearly indicate otherwise.

Referring to FIGS. 1-19 various multiaxial receivers 100, 101, 102, 103, and 104 for use with a tether are disclosed. The components can be fabricated from biologically acceptable materials suitable for medical applications, including metals, synthetic polymers, ceramics and bone material and/or their composites. For example, the components, individually or collectively, can be fabricated from materials such as stainless steel alloys, commercially pure titanium, titanium alloys, Grade 5 titanium, super-elastic titanium alloys, cobalt-chrome alloys, superelastic metallic alloys (e.g., Nitinol, super elasto-plastic metals, such as GUM METAL®), ceramics and composites thereof such as calcium phosphate (e.g., SKELITE™), thermoplastics such as polyaryletherketone (PAEK) including polyetheretherketone (PEEK), polyetherketoneketone (PEKK) and polyetherketone (PEK), carbon-PEEK composites, PEEK-BaSO4 polymeric rubbers, polyethylene terephthalate (PET), fabric, silicone, polyurethane, silicone-polyurethane copolymers, polymeric rubbers, polyolefin rubbers, hydrogels, semi-rigid and rigid materials, elastomers, rubbers, thermoplastic elastomers, thermoset elastomers, elastomeric composites, rigid polymers including polyphenylene, polyamide, polyimide, polyetherimide, polyethylene, epoxy, bone material including autograft, allograft, xenograft or transgenic cortical and/or corticocancellous bone, and tissue growth or differentiation factors, partially resorbable materials, such as, for example, composites of metals and calcium-based ceramics, composites of PEEK and calcium based ceramics, composites of PEEK with resorbable polymers, totally resorbable materials, such as, for example, calcium based ceramics such as calcium phosphate, tri-calcium phosphate (TCP), hydroxyapatite (HA)-TCP, calcium sulfate, or other resorbable polymers such as polyaetide, polyglycolide, polytyrosine carbonate, polycaroplaetohe, polylactic acid or polylactide and their combinations.

Figure 17:
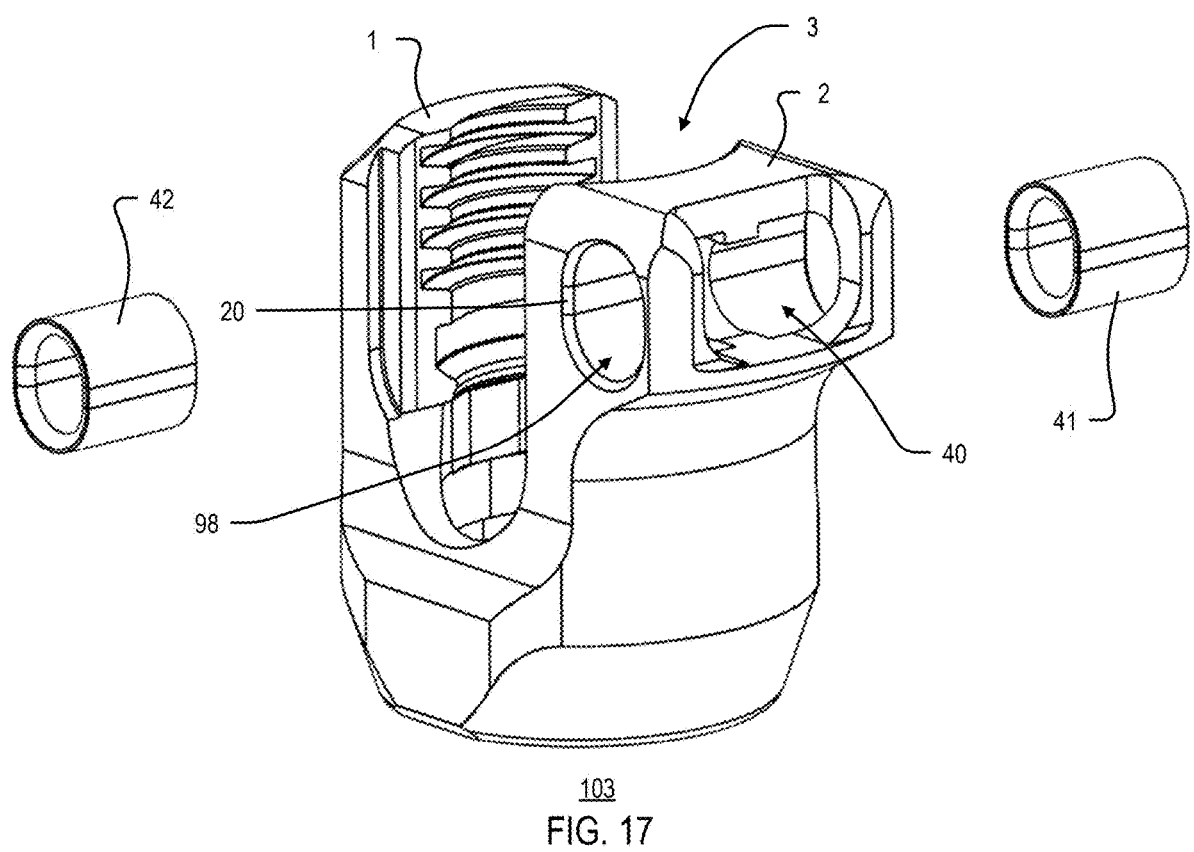
FIG. 17 is an exploded parts view of the multiaxial receiver embodiment of FIG. 15.
Figure 18:
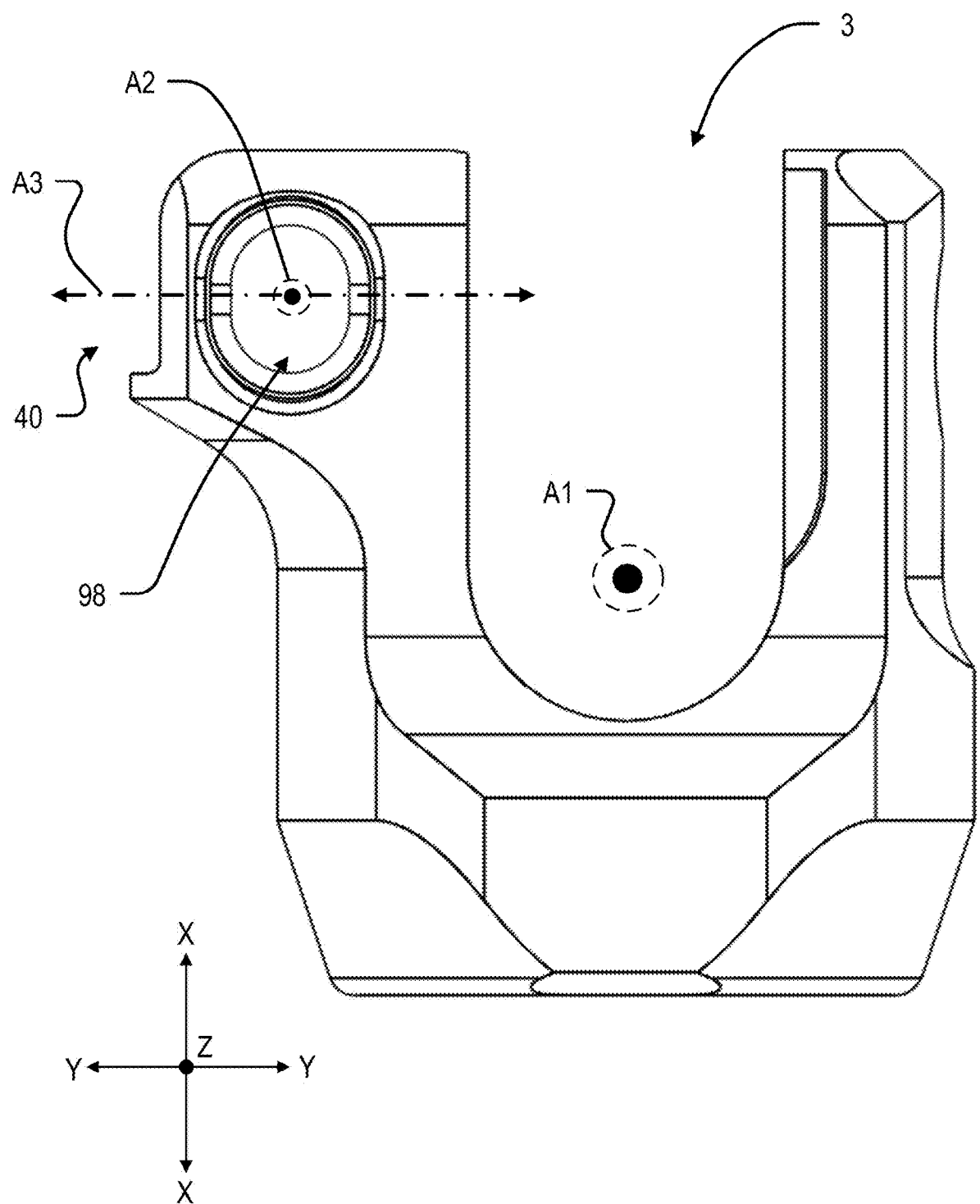
FIG. 18 is a side view of the multiaxial receiver embodiment of FIG. 15.
Figure 19:
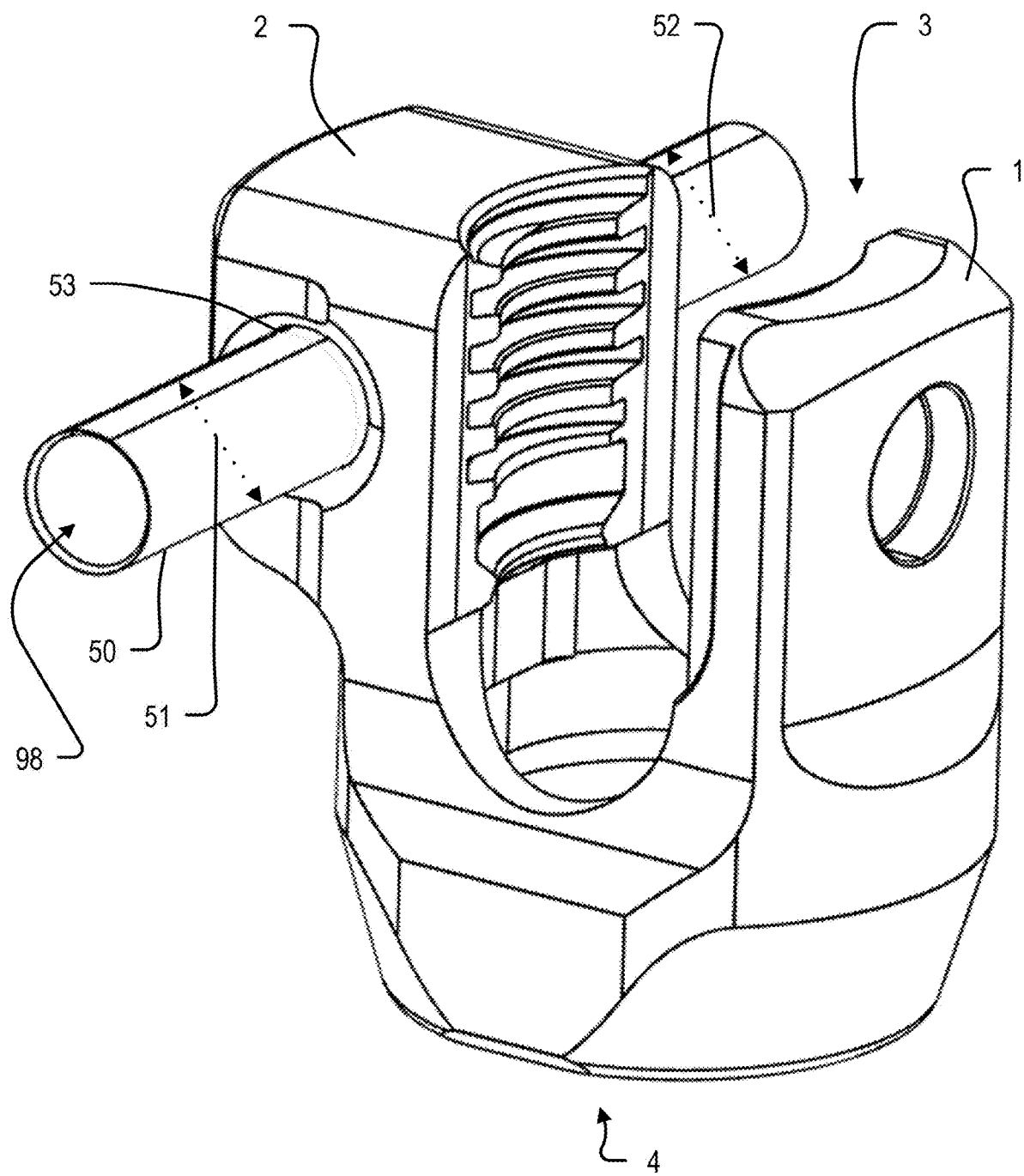
FIG. 19 is a perspective view of a fifth multiaxial receiver embodiment.

FIGS. 1-6 illustrate a first multiaxial receiver embodiment 100, FIGS. 7-10 illustrate a second multiaxial receiver embodiment 101, FIGS. 11-14 illustrate a third multiaxial receiver embodiment 102, FIGS. 15-18 illustrate a fourth multiaxial receiver embodiment 103, and FIG. 19 illustrates a fifth multiaxial receiver embodiment 104.

Figure 2:
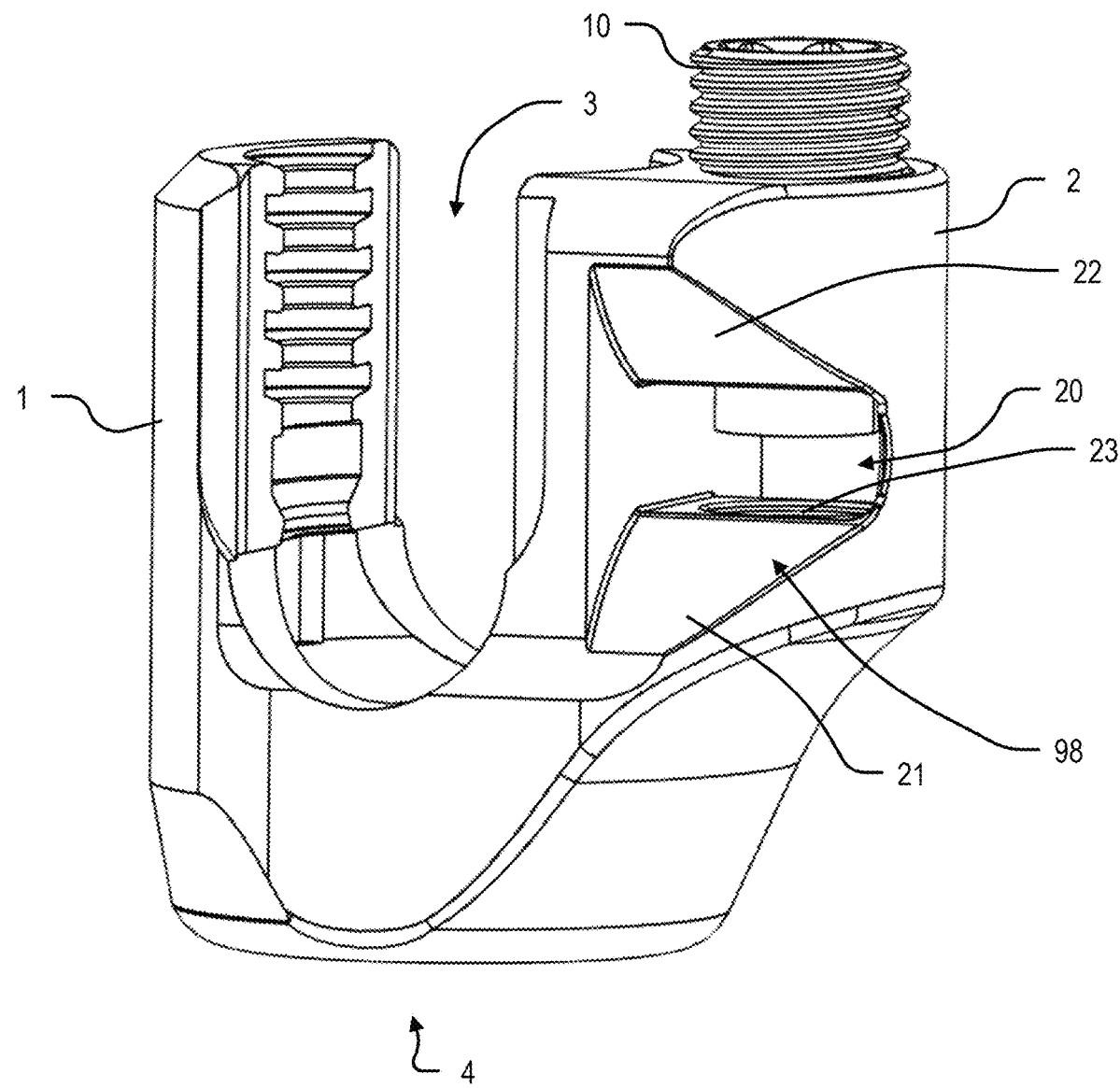
FIG. 2 is a second perspective view of the multiaxial receiver embodiment of FIG. 1.
Figure 3:
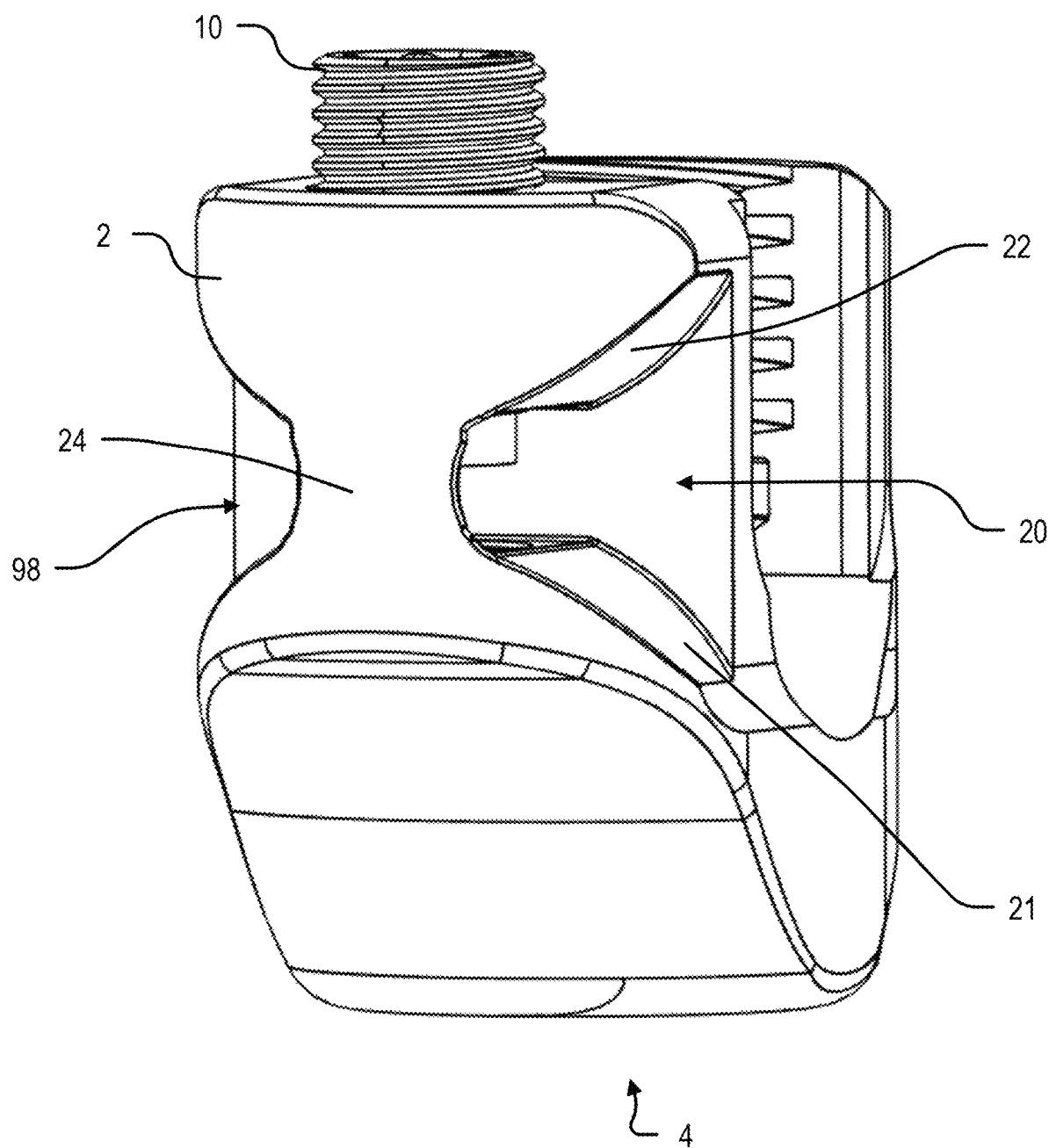
FIG. 3 is a third perspective view of the multiaxial receiver embodiment of FIG. 1.
Figure 4:
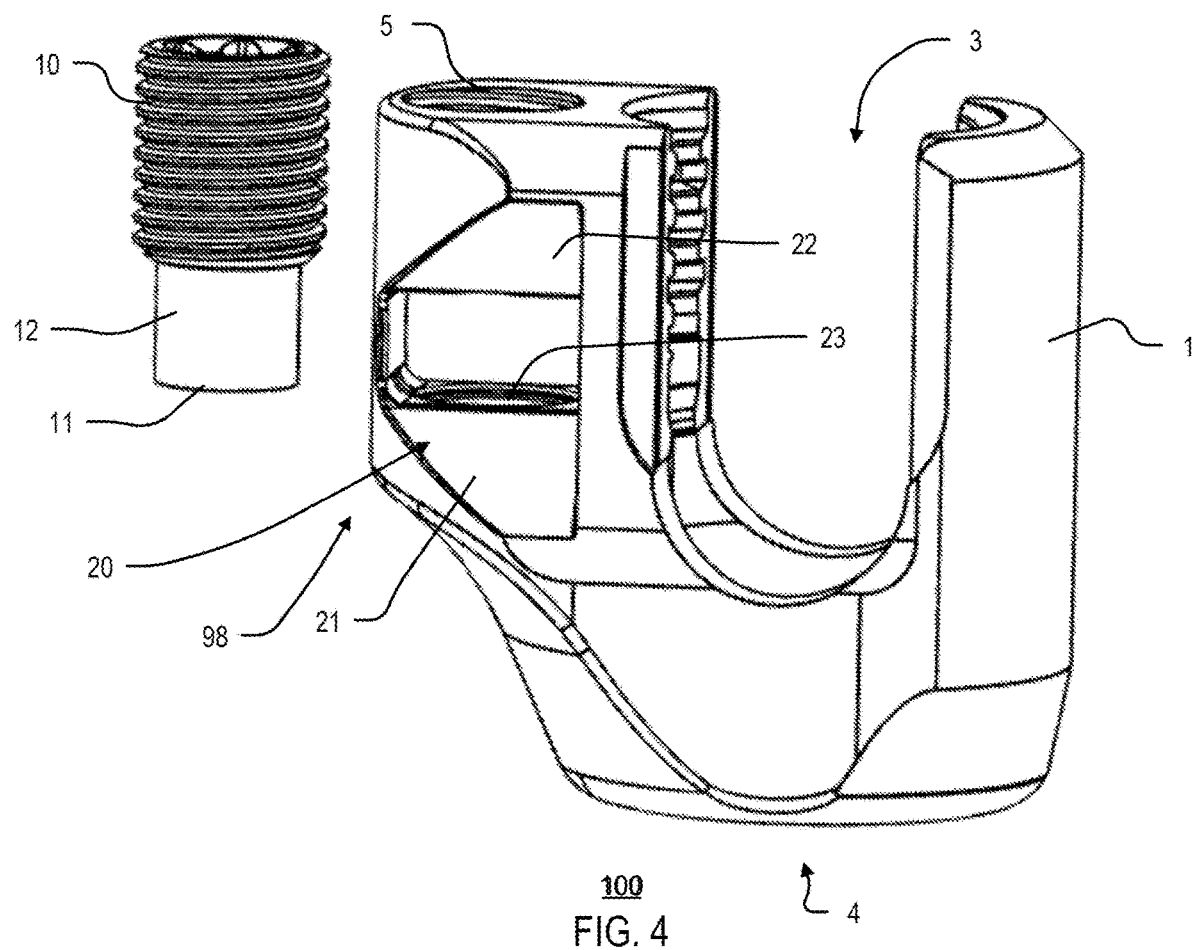
FIG. 4 is an exploded parts view of the multiaxial receiver embodiment of FIG. 1.
Figure 5:
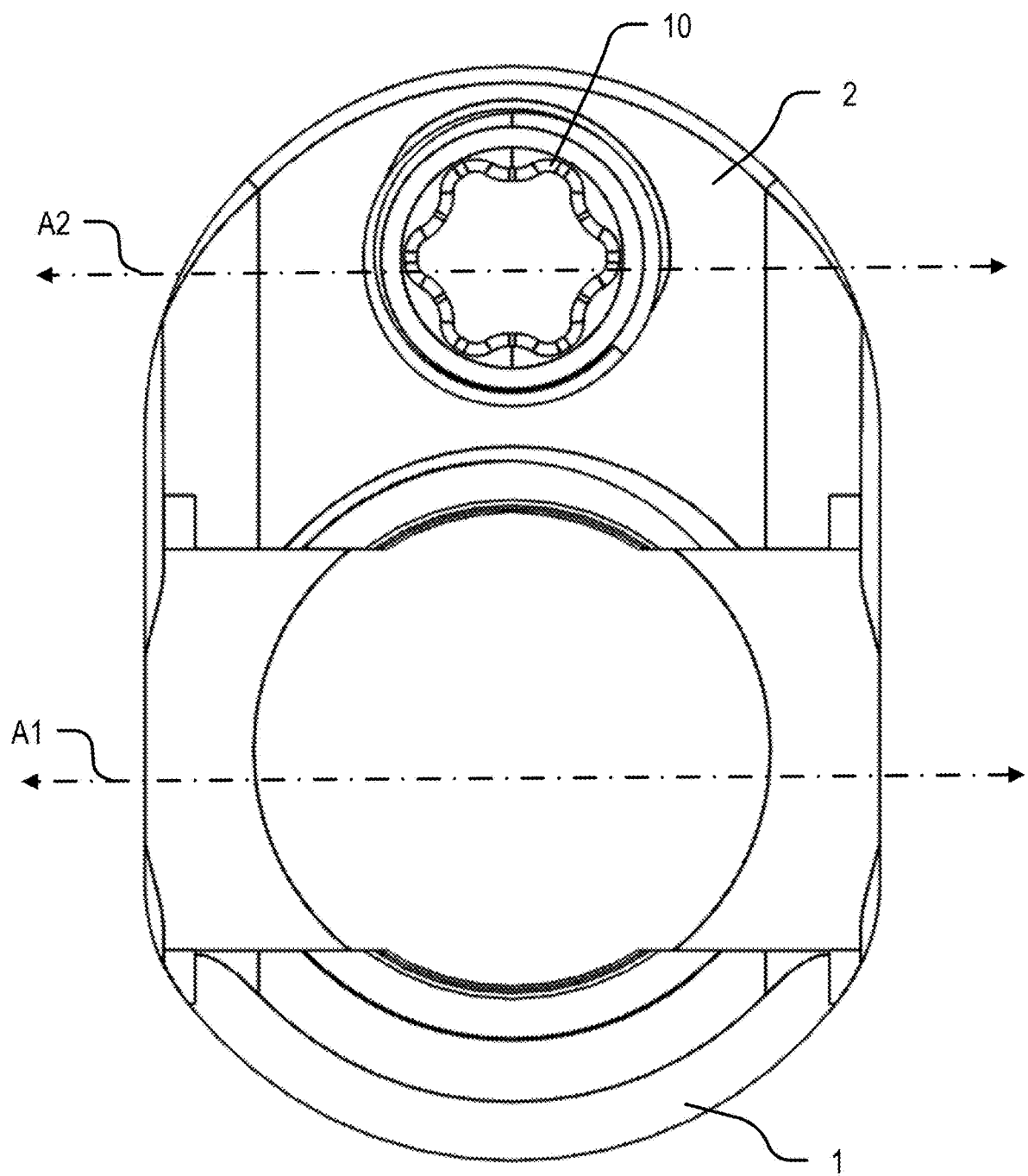
FIG. 5 is a top view of the multiaxial receiver embodiment of FIG. 1.
Figure 6:
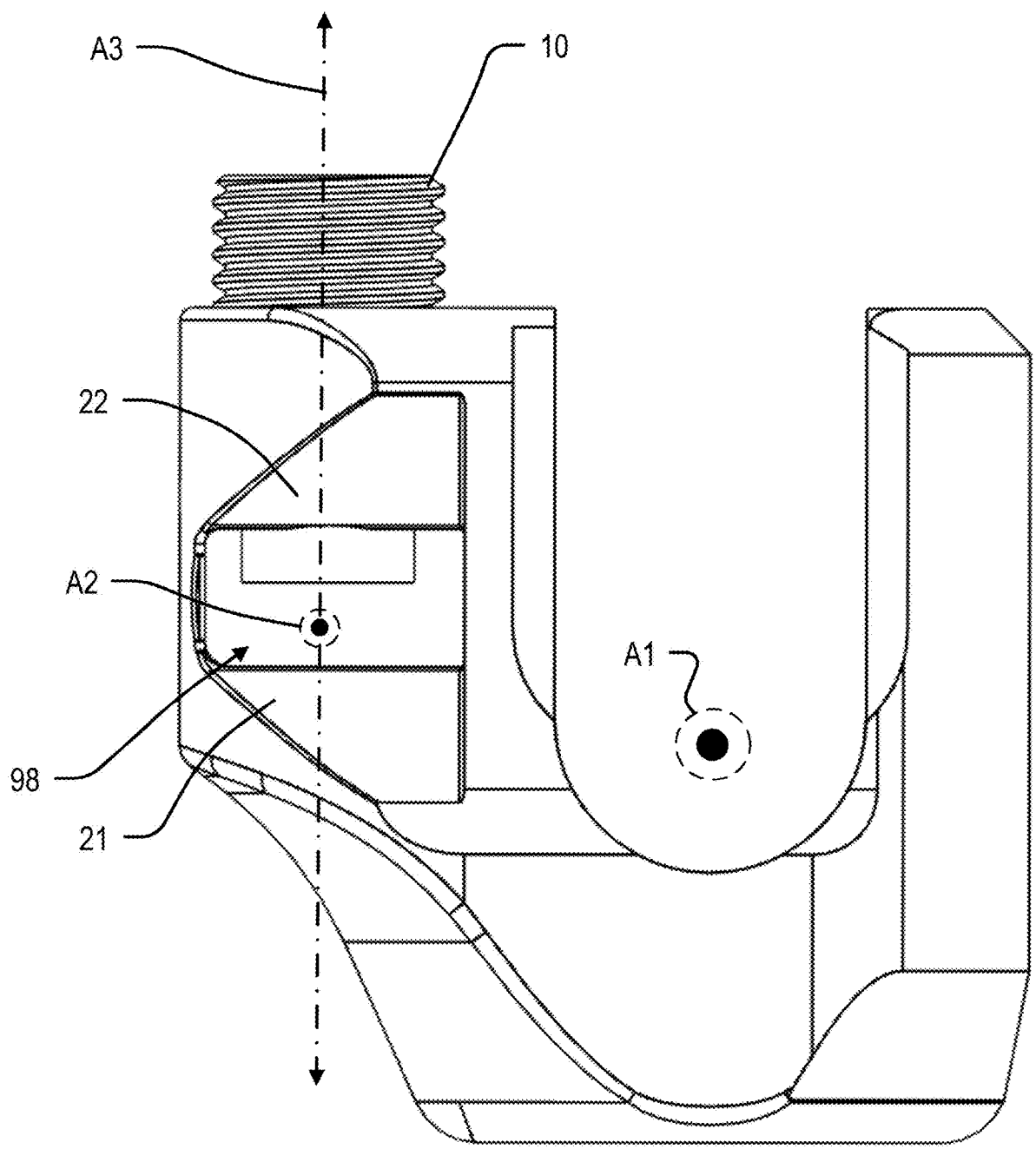
FIG. 6 is an elevation view of the multiaxial receiver embodiment of FIG. 1.

Referring generally to FIGS. 1-6 a first multiaxial receiver embodiment 100 is disclosed. FIG. 1 is a first perspective view of the multiaxial receiver 100; FIG. 2 is a second perspective view; FIG. 3 is a third perspective view; FIG. 4 is an exploded parts view; FIG. 5 is a top view; and FIG. 6 is an elevation view. In various embodiments, receiver 100 may include a body 1 having a lower cavity 4 for coupling with the head of a pedicle screw (not illustrated) and a U-shaped rod receiving cavity 3 for receiving a longitudinal rod therein (not illustrated). In various embodiments, the body 1 may extend in a vertical direction along a longitudinal axis and extend in a horizontal direction along a widthwise axis. In various embodiments, the longitudinal rod may be oriented in a horizontal direction along Axis A1 (see FIG. 6). In various embodiments, the lower cavity 4 may include grooves, slots, and applicable features for housing various rings, crowns, c-clips etc. that allow receiver 100 to couple to the head of a pedicle screw in a multitude of angled orientations, i.e., receiver 100 may be a multiaxial receiver as understood by a person of ordinary skill in the art. In the example embodiment, the U-shaped cavity may include a thread form for mating with a set screw that secures the longitudinal rod from above as understood by a person of ordinary skill in the art. In various embodiments, a first step of installation and/or operation may include initially securing the body 1 to the pedicle screw and thereafter securing the longitudinal rod within the U-shaped cavity. Once the body 1 and longitudinal rod are secured in position thereafter a surgeon may pass a tether through an aperture of the body 1 and tighten the tether as will be explained in further detail below. Additionally, it shall be understood that in some embodiments, the surgeon may pass the tether through an aperture of the body 1 before securing the body 1 to the pedicle screw and/or rod. In summary, embodiments in accordance with the principles herein provide a surgeon with the capability of performing different installation sequences, e.g., the tether may be passed either before, after, or even concurrently with securing body 1 to the pedicle screw.

Body 1 may include an enlarged side portion 2 with various apertures and passageways for receiving a tether (not illustrated) and various types of immobilization assemblies for securing the tether with respect to the receiver 100. In this embodiment, receiver 100 may include an aperture 20 extending through portion 2 from a first side to a second side. In disclosed embodiments, aperture 20 may be flared out and include various contoured surfaces configured to facilitate the passage of a tether therethrough from various different angles of approaches while providing a relatively large bearing surface to support and/or orient the tether. For example, each side of aperture 20 may be defined, at least partly, by a lower ramped surface 21 and an upper ramped surface 22 that each slope towards a flattened bearing surface, i.e., a bottom surface of passageway 98 such as indentation 23. In this way, each side of aperture 20 may be flared out and defined by an upper ramped surface 22 and a lower ramped surface 21. In other embodiments these upper and lower surfaces may be tapered and/or curved. With reference to FIG. 3, a medial position of passageway 98, body 2 may include a closed surface 24 partly enclosing aperture 20 from a side thereof. However, in other embodiments, closed surface 24 may be omitted and aperture 20 may be include an open slot in lieu of closed surface 24.

With reference to FIG. 4, receiver 100 may include a threaded aperture 5 for supporting an immobilization assembly. In this embodiment, the immobilization assembly may simply comprise a set screw 10 that is disposed in a threaded aperture 5 such that the set screw may be rotated and travel up and down in a vertical direction. For example, as shown in FIG. 6, set screw 10 may travel up and downward along axis A3. In various embodiments, set screw 10 may include any number or length of threads along an outside surface thereof and a portion of the outside surface may comprise a smooth circular surface 12. Additionally, a bottom most surface of set screw 10 may include a smooth, flat, and/or planar surface. In use, a tether may be passed through horizontal tether receiving passageway 98 and set screw 10 may be rotated such that it travels downward towards the tether. As the set screw 10 advances, it may pin the tether against a lower most surface of the horizontal passageway 98. As seen best in FIG. 4, in this embodiment the lower most surface of the horizontal passageway 98 includes a flattened circular indentation 23 (see also FIG. 1) having a size and shape that corresponds to a size and shape of the bottom of set screw 10. In this way, set screw 10 may pin the tether against the flattened circular indentation 23. In at least some embodiments, surfaces 23 and 12 may be high friction surfaces that are knurled surfaces, textured surfaces comprising a plurality of protrusions, and/or surfaces that are coated with a high friction coating.

As seen best in FIGS. 5-6 the horizontal tether receiving passageway 98 may approximately define a second axis A2. In this example, aperture 20 may define a horizontal tether receiving passageway 98 that extends in a direction that is substantially parallel to an extension direction of a longitudinal rod placed in the rod receiving cavity 3. For example, as seen best in FIGS. 5-6, axes A2 and A1 are substantially parallel to one another. Additionally, axis A3 is substantially perpendicular to axis A2 and will intersect it such that the set screw 10 may immobilize a tether therein.

Figure 7:
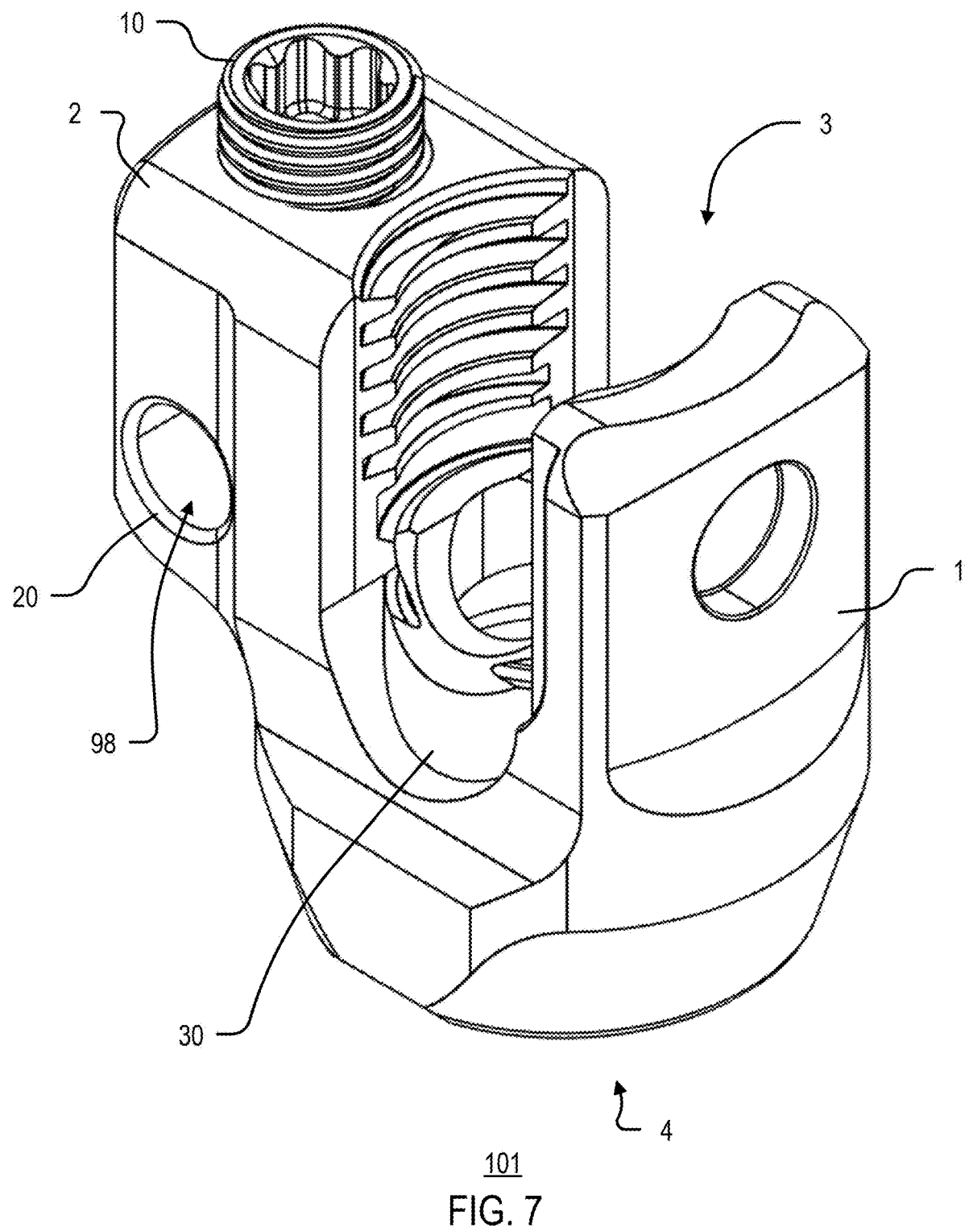
FIG. 7 is a perspective view of a second multiaxial receiver embodiment.
Figure 8:
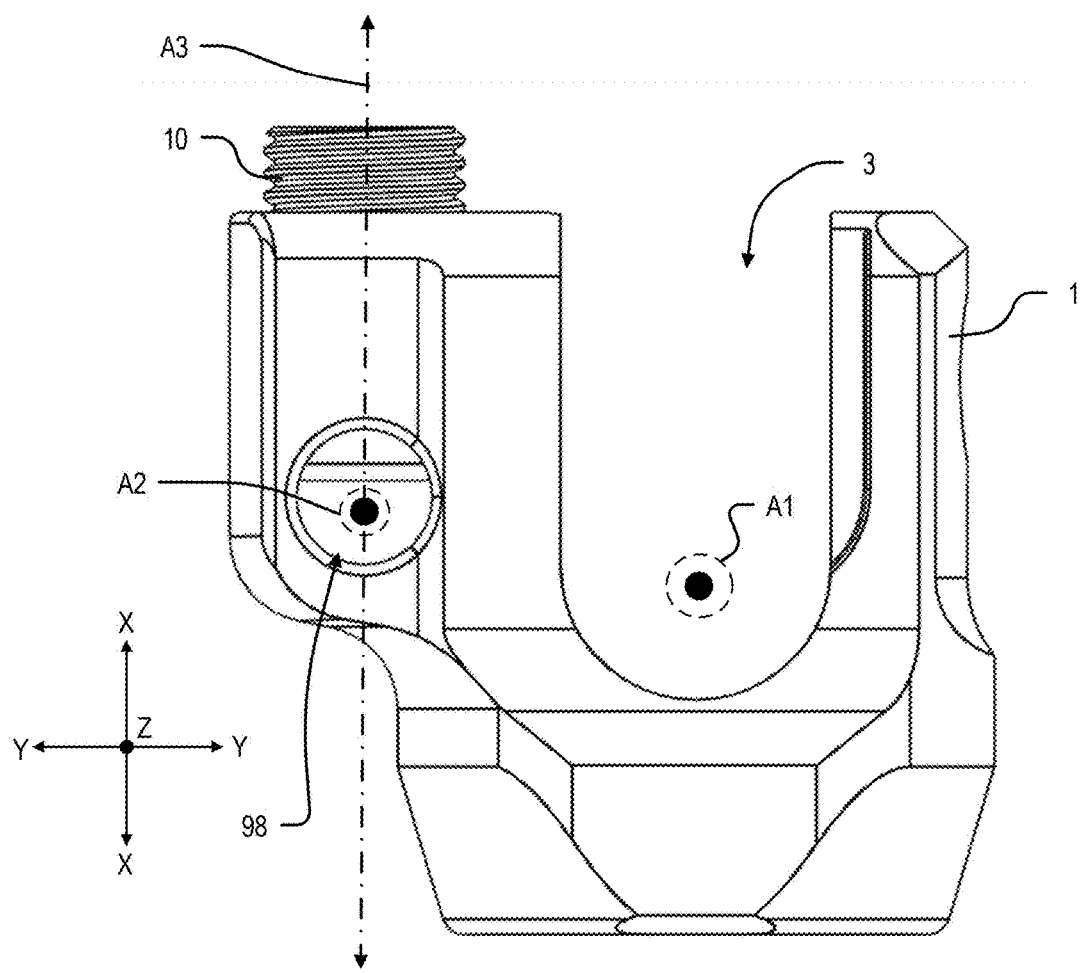
FIG. 8 is a side view of the multiaxial receiver embodiment of FIG. 7.
Figure 9:
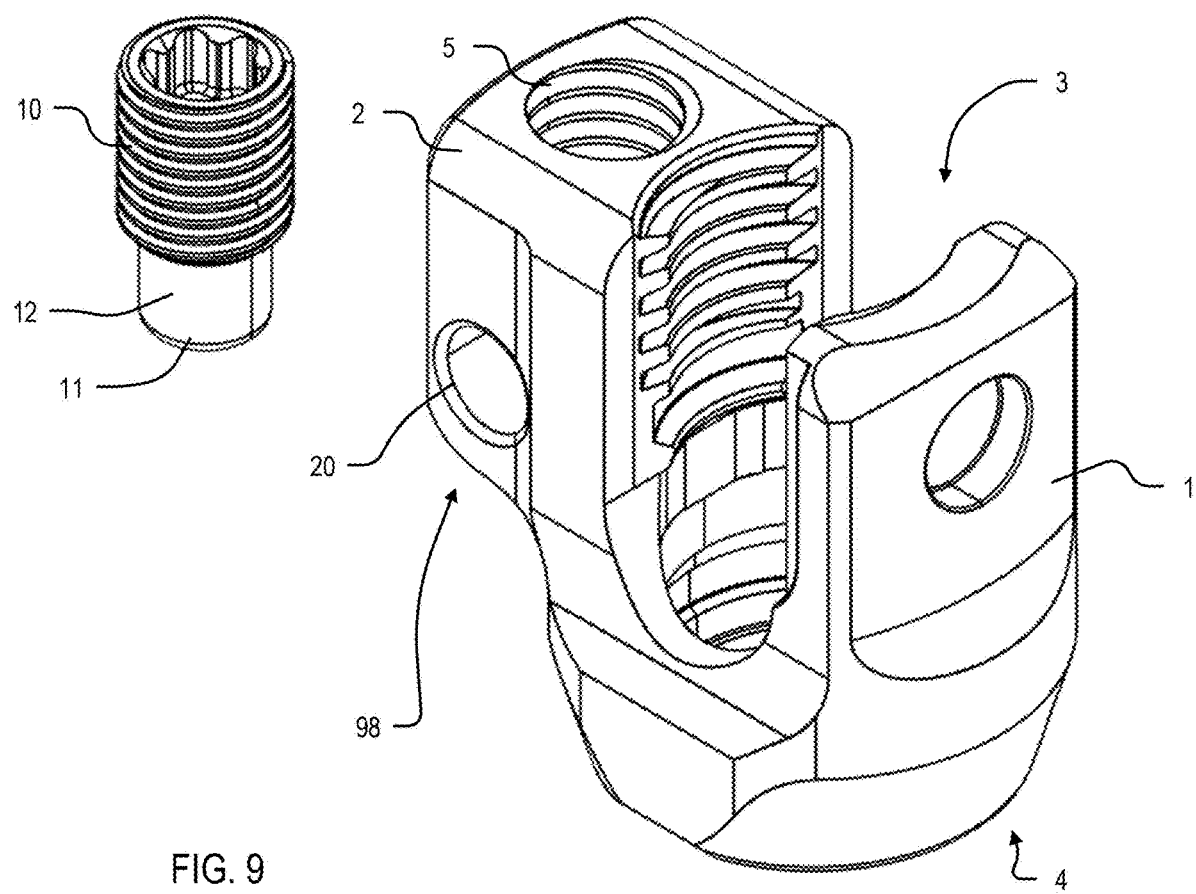
FIG. 9 is an exploded parts view of the multiaxial receiver embodiment of FIG. 7.
Figure 10:
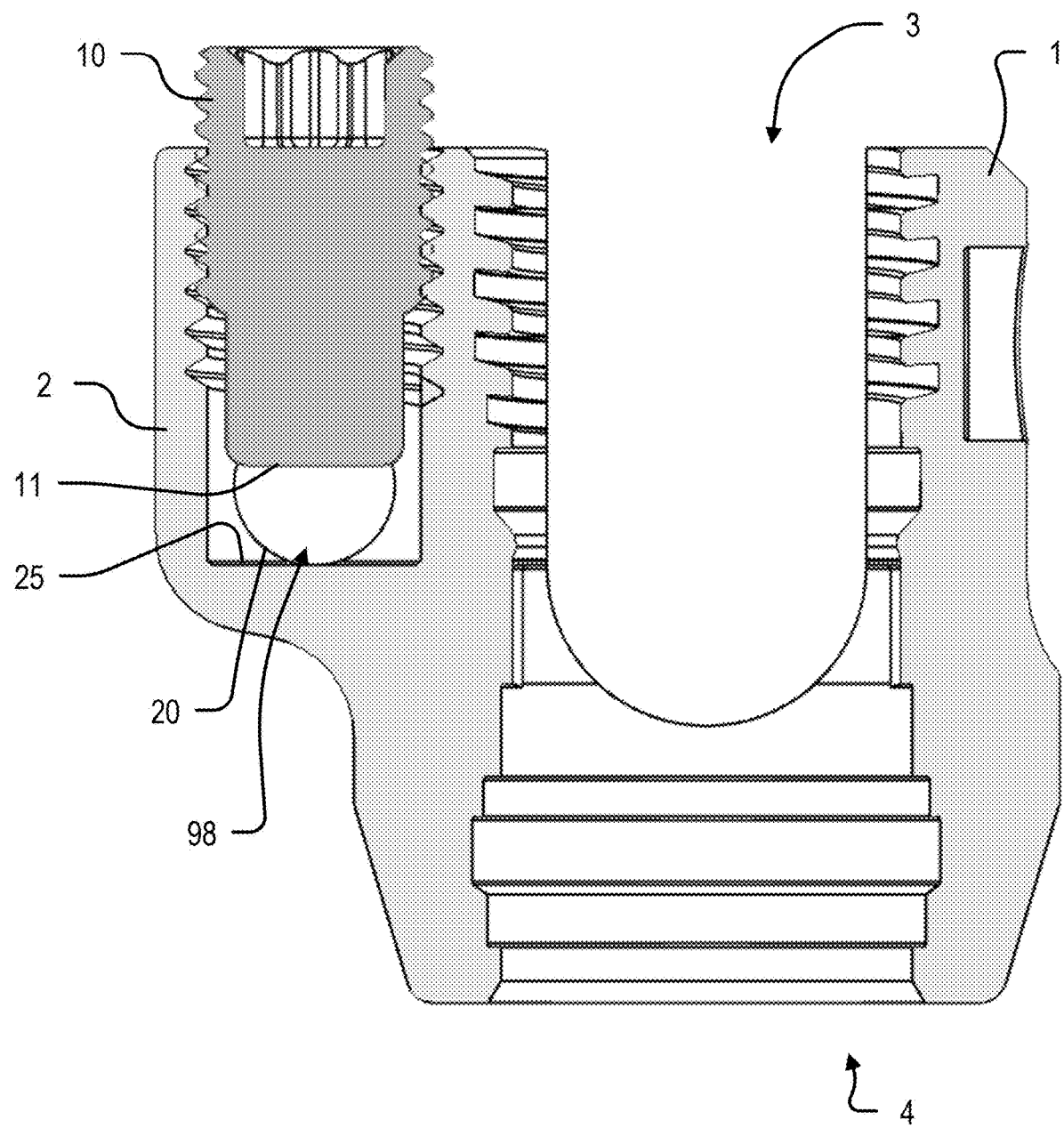
FIG. 10 is a cross section view of the multiaxial receiver embodiment of FIG. 7.

FIGS. 7-10 illustrate a second multiaxial receiver embodiment 101 is disclosed. FIG. 7 is a perspective view of a second multiaxial receiver embodiment 101; FIG. 8 is a side view; FIG. 9 is an exploded parts view; and FIG. 10 is a cross section view of the multiaxial receiver embodiment of FIG. 7. Multiaxial receiver 101 may include the same, similar, and/or substantially the same components and functionality as explained above with respect to multiaxial receiver 100. Accordingly, duplicative description will be omitted. In this embodiment multiaxial receiver 101 may differ in that it does not include the upper and lower ramped surfaces 21, 22 and rather utilizes a circular aperture 20. Additionally, this embodiment is helpful for explaining additional components of receiver 101 which may interact with a longitudinal rod and/or pedicle screw. For example, crown 30 may sit on top of the head portion of a pedicle screw to situate and/or support the longitudinal rod at an appropriate height.

As seen best in FIG. 8, the horizontal tether receiving passageway 98 may be a circular shaped aperture defining a cylindrical passageway 98 that extends through side portion 2 from a first end to an opposite second end. In this example, aperture 20 may define a horizontal tether receiving passageway 98 that extends in a direction that is substantially parallel to an extension direction of a longitudinal rod placed in the rod receiving cavity 3. For example, as seen best in FIG. 8, axes A2 and A1 are substantially parallel to one another. Additionally, axis A3 is substantially perpendicular to axis A2 and will intersect it such that the set screw 10 may immobilize a tether disposed in the horizontal passageway 98. As seen best in FIGS. 9-10, set screw 10 may include a planar bottom surface 11. However, in other embodiments, set screw 10 may include a dimple and/or protrusion at a bottom surface thereof configured to facilitate the immobilization of a tether and/or approximate a cross section of tether receiving passageway 98, e.g., a bottom surface of the set screw 10 may be domed to correspond to a substantially circular cross section of passageway 98. In the cross section drawing in FIG. 10, a section drawing is shown that bisects receiver 101 in the horizontal direction. In FIG. 10, it is shown that the horizontal tether receiving passageway 98 has an interior cavity in a medial position thereof with a planar bottom surface 25. For example, tether receiving passageway 98 includes a medial portion having a planar bottom surface 25 that is surrounded by a first portion with a substantially circular diameter and a second portion with a substantially circular diameter that is opposite the first portion and on the other side of the planar bottom surface 25. Referring generally to the embodiment of FIGS. 7-10, a tether may be passed either (a) once through passageway 98 and tied off, secured, or wrapped to patient anatomy and/or connected to another implant, or (b) the tether may be appropriately sized to in length and thickness such that it may be passed through passageway 98 a first time and tied off, secured, or wrapped to patient anatomy and/or connected to another implant and thereafter passed back through passageway 98 a second time and tied off, secured, or wrapped to patient anatomy and/or connected to another implant. In summary, a relatively shorter and/or thicker tether may only pass one through passageway 98 and a relatively longer and thicker tether may pass through passageway 98 two times by doubling back on itself. Referring to the next embodiment, shown in FIGS. 11-14, two passageways 98 and 99 may each independently support a relatively thick tether. In this sense, a first relatively thick and strong tether may pass through passageway 98 or 99 and a second relatively thick and strong tether may pass through the other of passageways 98, 99. Similarly, a single relatively thick and strong tether may first pass through passageway 98 or 99 and thereafter make a second pass through the other of passageways 98, 99.

Figure 11:
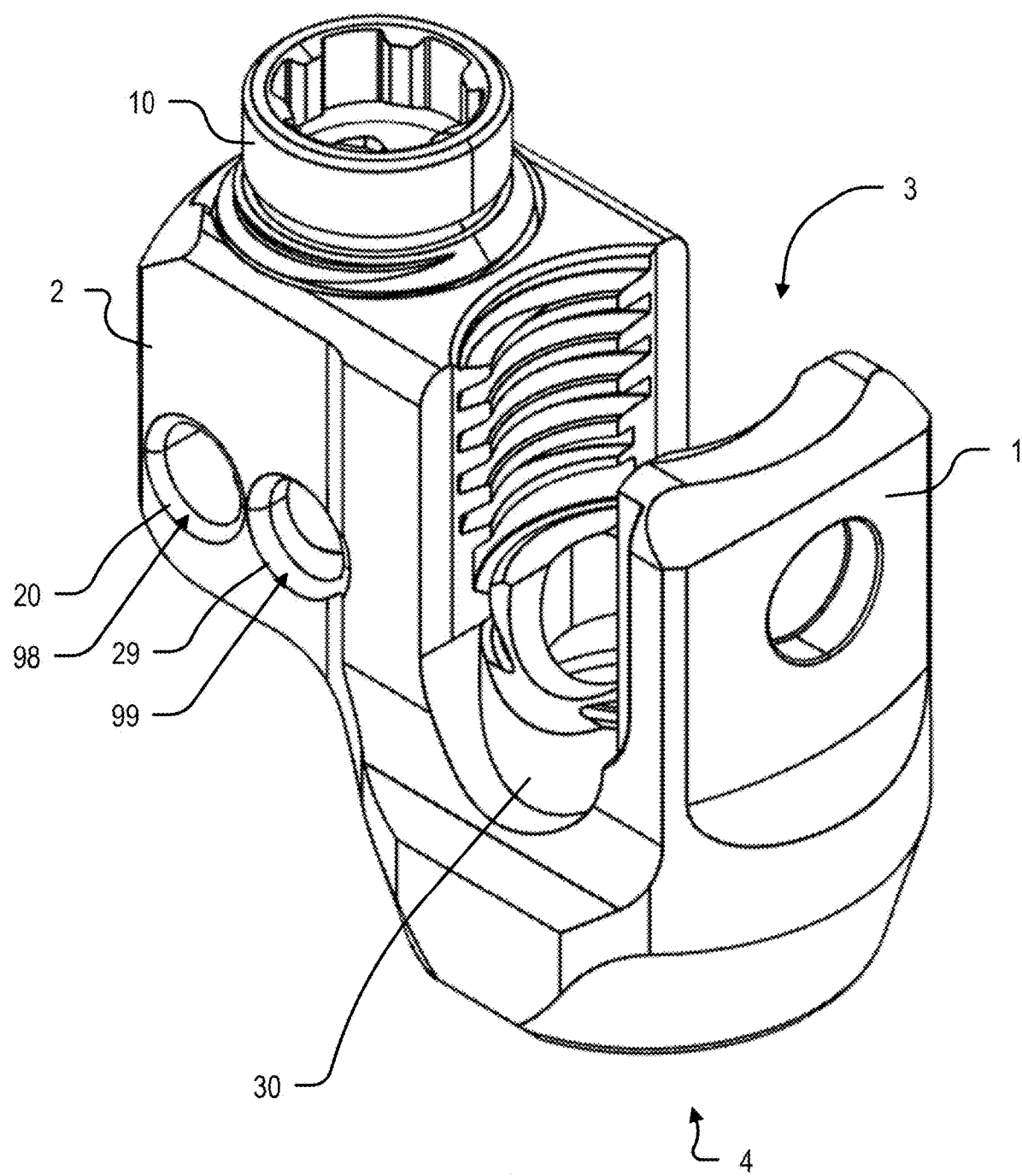
FIG. 11 is a perspective view of a third multiaxial receiver embodiment.
Figure 12:
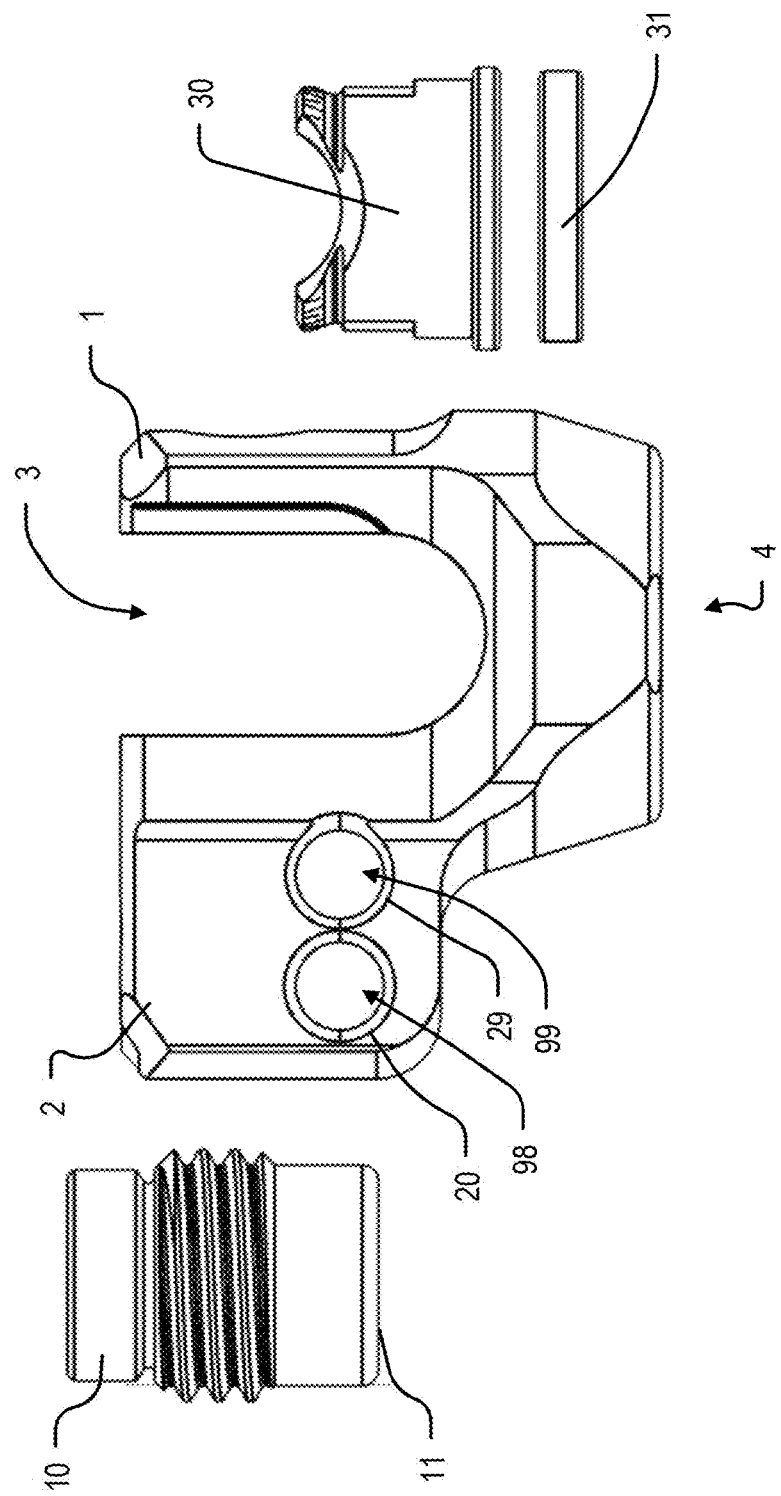
FIG. 12 is an exploded parts view of the multiaxial receiver embodiment of FIG. 11.
Figure 13:
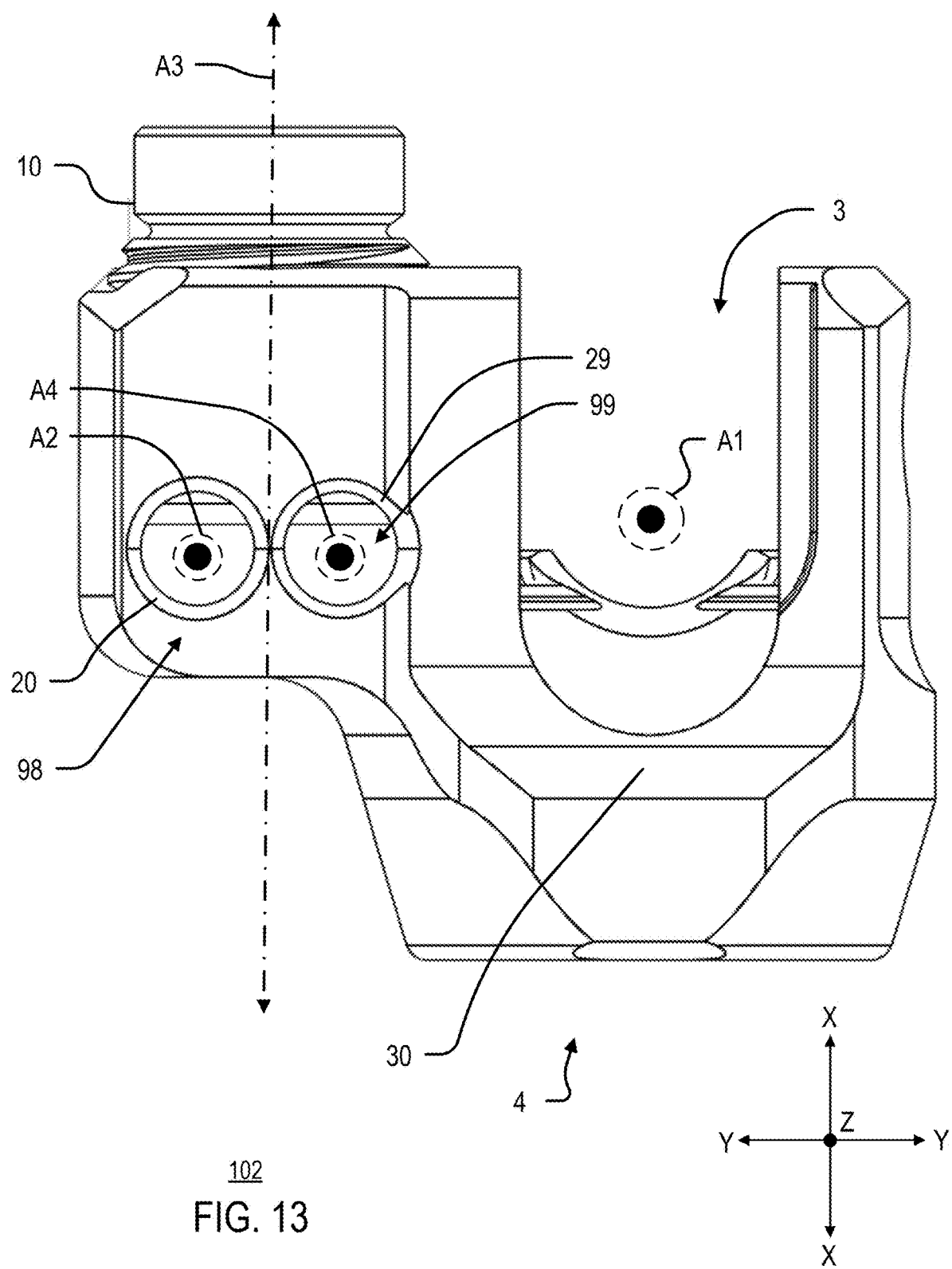
FIG. 13 is a side view of the multiaxial receiver embodiment of FIG. 11.
Figure 14:
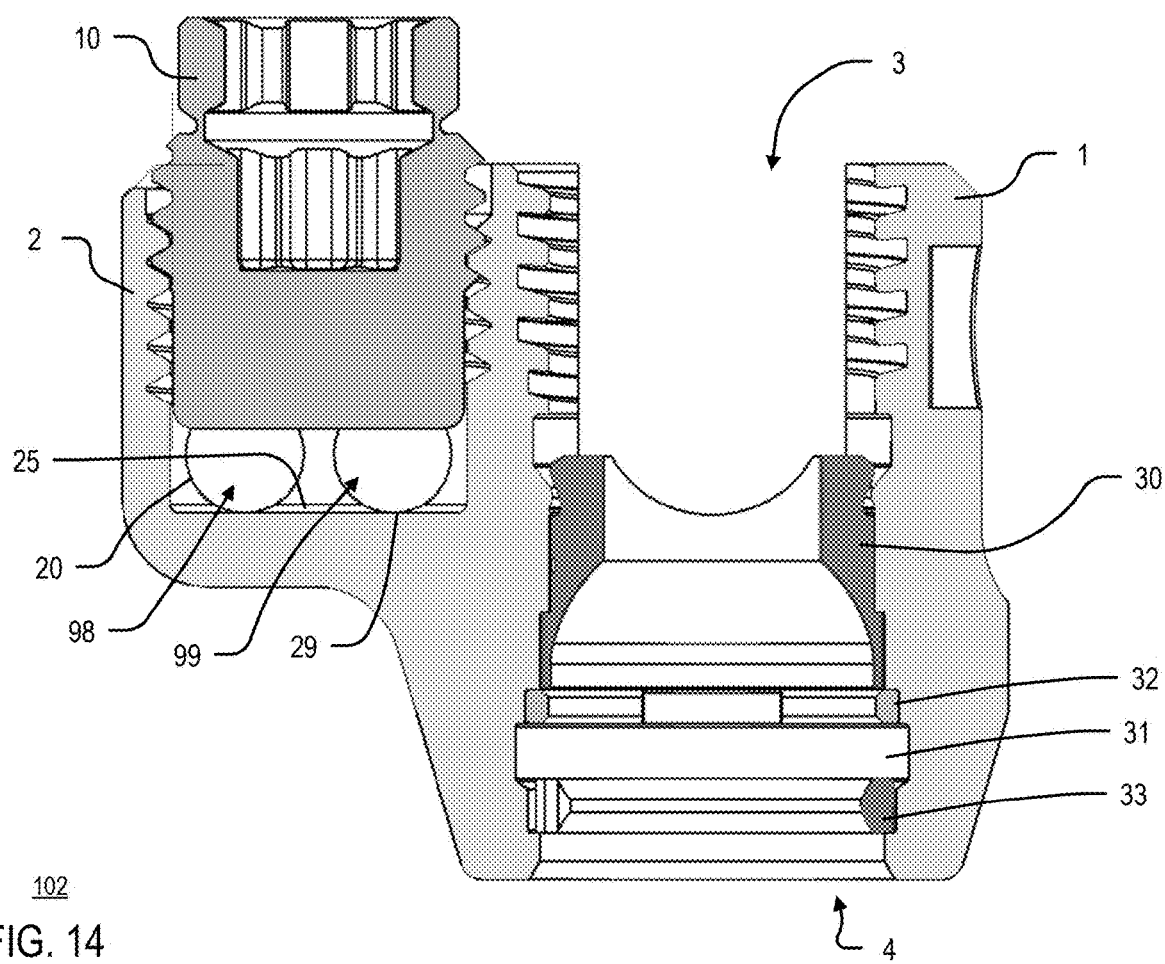
FIG. 14 is a cross section view of the multiaxial receiver embodiment of FIG. 11.

FIGS. 11-14 illustrate a third multiaxial receiver embodiment 102. FIG. 11 is a perspective view of a third multiaxial receiver 102; FIG. 12 is an exploded parts view; FIG. 13 is a side view of the multiaxial receiver; and FIG. 14 is a cross section view of the multiaxial receiver 102. Multiaxial receiver 102 may include the same, similar, and/or substantially the same components and functionality as explained above with respect to multiaxial receivers 100, 101. Accordingly, duplicative description will be omitted. This embodiment shares many similarities with the second multiaxial receiver embodiment 101 of FIGS. 7-10; however, a second aperture 29 may define an additional second horizontal tether receiving passageway 99.

With reference to FIGS. 11-12, it is shown that receiver 102 may include an enlarged side portion 2 having a first circular aperture 20 and a second circular shaped aperture 29. In various embodiments, the first and second apertures 20, 29 may be disposed directly adjacent one another and at substantially the same elevation. However, in other embodiments, an elevation of the first aperture 20 may be different than an elevation of the second aperture 29. In the exploded parts view of FIG. 12, it shown that receiver 102 (and the other receivers disclosed herein) may include a saddle and/or crown 30 for supporting a longitudinal rod and any number of washers 31, annular rings 33, c-rings 32, etc. for facilitating the coupling of multiaxial receiver 102 to a pedicle screw (not illustrated). For example, As shown in the cross-section view of FIG. 14, washer 31, annular rings 33, c-rings 32 etc. are disposed in a corresponding annular groove of the lower receiving cavity 4. In this way, multiaxial receiver 102 may be popped on to the head of a pedicle screw simply by pressing down on receiver 102 as would be understood by a person of ordinary skill in the art.

As shown in FIG. 13, a first horizontal tether receiving passageway 98 may be a circular shaped aperture defining a cylindrical passageway 98 that extends through side portion 2 from a first end to an opposite second end along axis A2. Similarly, a second horizontal tether receiving passageway 99 may be a circular shaped aperture defining a cylindrical passageway 99 that extends through the side portion 2 from the first end to the opposite second end along axis A4. In the example embodiment, axis A2 and axis A4 are substantially parallel to one another and are disposed at approximately the same elevation with respect to a bottom surface of receiver 102. Additionally, axis A3 is substantially perpendicular to axes A2 and A4 and will intersect them both such that the set screw 10 may immobilize at least one tether disposed in passageway 98, 99. In some embodiments, the same tether may perform a first pass through one of passageways 98, 99 and then perform a second pass through the other one of passageways 98, 99. Thereafter, any tether(s) passing through passageways 98, 99 may be immobilized by a single set screw 10.

As seen best in FIGS. 12 and 14, set screw 10 may include a planar bottom surface 11. However, in other embodiments, set screw 10 may include a dimple and/or protrusion at a bottom surface thereof configured to facilitate the immobilization of a tether and/or approximate tether receiving passageways 98, 99 having a substantially circular cross section. In the cross section drawing in FIG. 14, a section drawing is shown that bisects receiver 102 in the horizontal direction. In FIG. 14, it is shown that the first and second horizontal tether receiving passageways 98, 99 communicate with one another at an interior cavity having a bottom surface 25. For example, a medial position of passageways 98, 99 may include a cavity or other void space having a common bottom surface 25. Accordingly, in this example, a relatively large set screw 10 may advance downward along axis A3 such that a bottom surface of set screw 10 may move downward such that it pins a tether(s) in either of passageways 98, 99 against the common bottom surface 25. For example, first tether receiving passageway 98 may include a medial portion having a planar bottom surface 25 that is surrounded by a first section of passageway 98 having a substantially circular diameter and a second section of passageway 98 having a substantially circular diameter that is opposite the first portion. Likewise, second tether receiving passageway 99 may include a medial portion having a planar bottom surface 25 that is surrounded by a first section of passageway 99 having a substantially circular diameter and a second section of passageway 99 having a substantially circular diameter that is opposite the first portion. In this way, a common cavity having a common bottom surface 25 may communicate with both passageways 98, 99.

Figure 15:
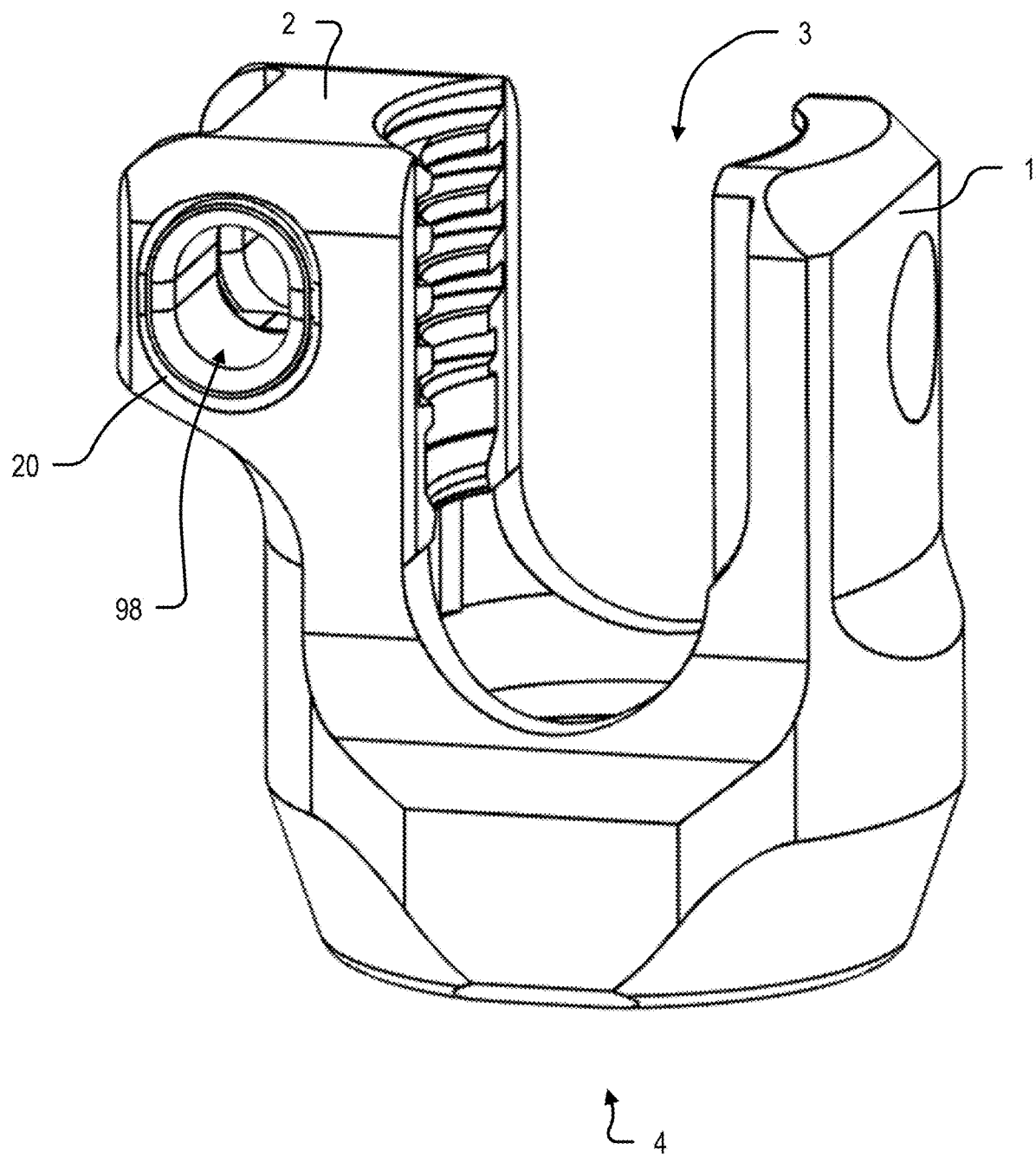
FIG. 15 is a first perspective view of a fourth multiaxial receiver embodiment.
Figure 16:
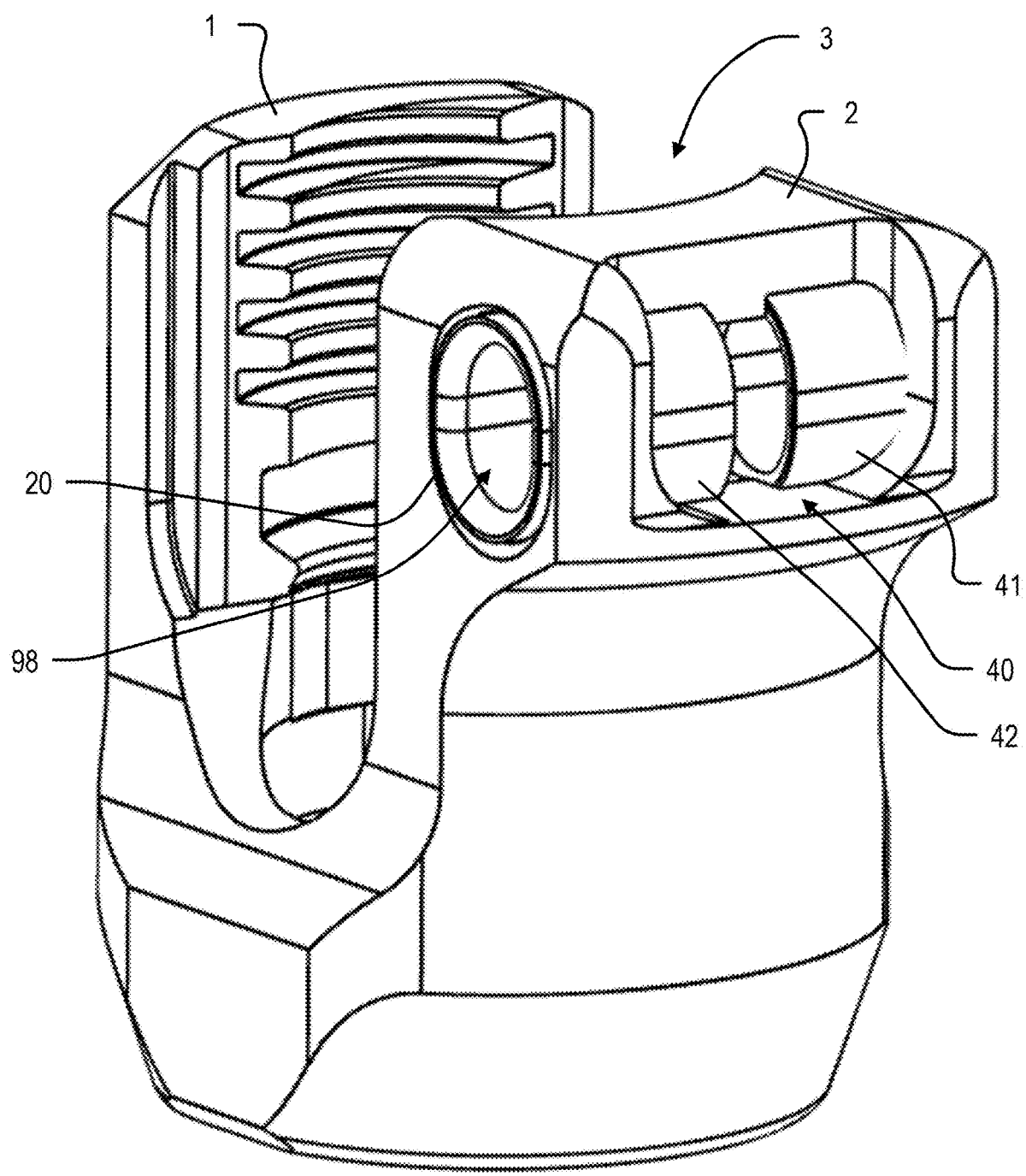
FIG. 16 is a second perspective view of the multiaxial receiver embodiment of FIG. 15.

FIGS. 15-18 illustrate a fourth multiaxial receiver embodiment 103. FIG. 15 is a first perspective view; FIG. 16 is a second perspective view; FIG. 17 is an exploded parts view; and FIG. 18 is a side view of the multiaxial receiver embodiment 103. Multiaxial receiver 103 may include the same, similar, and/or substantially the same components and functionality as explained above with respect to multiaxial receivers 100, 101, and 102. Accordingly, duplicative description will be omitted. In this embodiment, multiaxial receiver 103 includes an oval shaped aperture 20 defining a horizontal tether receiving passageway 98. As seen best in FIGS. 16-17, horizontal receiving passageway 98 may include a relatively large and open cavity 40 in a medial area that is dimensioned such that a first ferrule 41 and a second ferrule 42 may be disposed therein and accessed from the open cavity 40. In other embodiments the number of ferrules may differ, e.g., a single ferrule, three ferrules, four ferrules, etc.

As seen in FIG. 18, horizontal tether receiving passageway 98 may be used to pass a tether therein along axis A2 in a first horizontal direction corresponding to direction Z of the 3D coordinate legend. Once the tether is positioned in passageway 98, a crimping tool may apply pressure against the ferrules 41, 42 along axis A3. For example, pressure may be applied from the open cavity 40 (see FIG. 17) against the ferrules 41, 42 by a crimping tool (not illustrated) in a horizontal direction towards the U-shaped rod receiving cavity 3. In this way, the ferrules 41, 42 may deform and/or collapse against the tether due to being squeezed in a second horizontal direction corresponding to direction Y of the 3D coordinate legend.

FIG. 19 illustrates a fifth multiaxial receiver embodiment 104. Multiaxial receiver 104 may include the same, similar, and/or substantially the same components and functionality as explained above with respect to multiaxial receivers 100, 101, 102, and 103. Accordingly, duplicative description will be omitted. In this embodiment, a single extended ferrule 50 may have a substantially circular cross section and extend through an aperture 53. Additionally, the extended ferrule 50 may be hollow and define a horizontal tether receiving passageway 98. In use, a tether may be passed through the interior of extended ferrule 50 through one side and out the other side. Thereafter, a crimping tool may pinch the extended ferrule at a first crimping location 51 and then at a second crimping location 52. The crimping action may deform the extended ferrule 50 by collapsing it and/or flattening it. In doing so, the tether may become immobilized inside of the extended ferrule 50. Additionally, due to the crimping action, a width of the extended ferrule 50 may become greater than a cross section diameter of aperture 53. Accordingly, the extended ferrule 50 may be constrained from passing through the aperture 53.

It should be understood that various aspects disclosed herein may be combined in different combinations than the combinations specifically presented in the description and accompanying drawings. For example, features, functionality, and components from one embodiment may be combined with another embodiment and vice versa unless the context clearly indicates otherwise. Similarly, features, functionality, and components may be omitted unless the context clearly indicates otherwise. It should also be understood that, depending on the example, certain acts or events of any of the processes or methods described herein may be performed in a different sequence, may be added, merged, or left out altogether (e.g., all described acts or events may not be necessary to carry out the techniques).

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, elements, and/or components, but do not preclude the presence or addition of one or more other features, steps, operations, elements, components, and/or groups thereof

What is claimed is:

1. A multiaxial receiver, comprising:
   a body having a U-shaped cavity configured to receive a longitudinal rod therein and a lower cavity configured to couple to a pedicle screw, the body extending in a vertical direction along a longitudinal axis and extending in a horizontal direction along a widthwise axis;
   a side portion including a first aperture extending through a side surface thereof and defining a first passageway configured to permit a tether to pass therethrough in the horizontal direction; and
   a threaded aperture extending through an upper surface of the side portion and into the first passageway;
   a set screw disposed in the threaded aperture,
   wherein the set screw is configured to be rotated from an open position in which the tether is permitted to pass through the first passageway to a closed position in which the tether is immobilized within the first passageway;
   wherein a medial portion of the first passageway comprises a circular indentation having a size and shape corresponding to a size and shape of a flattened bottom surface of the set screw.

2. The multiaxial receiver of claim 1, wherein the lower cavity is configured to mate to a head of the pedicle screw that permits the multiaxial receiver to be angled with respect to an extension direction of the pedicle screw.

3. The multiaxial receiver of claim 1, wherein the flattened bottom surface is a high friction surface.

4. The multiaxial receiver of claim 1, wherein the medial portion of the first passageway comprises a flattened bearing surface.

5. The multiaxial receiver of claim 1, wherein the first aperture comprises a flared out portion configured to facilitate passing the tether therethrough.

6. The multiaxial receiver of claim 5, wherein:
   the medial portion of the first passageway comprises a flattened bearing surface; and
   the flared out portion comprises at least one ramped surface sloping towards the flattened bearing surface.

7. The multiaxial receiver of claim 1, wherein:
   the medial portion of the first passageway comprises a flattened bearing surface;
   a first side of the first aperture comprises a first flared out portion configured to facilitate passing the tether therethrough and a second side of the first aperture comprises a second flared out portion configured to facilitate passing the tether therethrough;
   the first flared out portion comprises at least one first ramped surface sloping towards the flattened bearing surface; and
   the second flared out portion comprises at least one second ramped surface sloping towards the flattened bearing surface.

8. The multiaxial receiver of claim 1, wherein the side portion further includes a second aperture extending through the side surface thereof and defining a second passageway configured to permit a tether to pass therethrough in the horizontal direction.

9. A multiaxial receiver, comprising:
   a body having a U-shaped cavity configured to receive a longitudinal rod therein and a lower cavity configured to couple to a pedicle screw, the body extending in a vertical direction along a longitudinal axis and extending in a horizontal direction along a widthwise axis;
   a side portion of the body comprising
      a first protrusion extending in the vertical direction and having a first through hole,
      a second protrusion extending in the vertical direction, having a second through hole, and being spaced apart from the first protrusion, and
      an open space between the first and second protrusions,
      wherein the first through hole, second through hole and open space are collectively configured to permit a tether to pass through the side portion of the body in the horizontal direction; and
   at least one ferrule disposed in at least one of the first through hole and the second through hole;
   wherein the at least one ferrule is configured to be crimped from an open position in which the tether is permitted to pass through the side portion of the body to a closed position in which the at least one ferrule is collapsed and the tether is immobilized within the side portion of the body.

10. The multiaxial receiver of claim 9, wherein the at least one ferrule comprises a first ferrule disposed in the first protrusion and a second ferrule disposed in the second protrusion.

11. The multiaxial receiver of claim 10, wherein at least a portion of each of the first ferrule and the second ferrule extends into the open space between the first and second protrusions.

12. The multiaxial receiver of claim 11, wherein the first ferrule and the second ferrule are configured to be crimped via the open space.

13. The multiaxial receiver of claim 9, wherein:
a first end of the at least one ferrule extends from the first protrusion in a first direction away from the open space;
a second end of the at least one ferrule extends in an opposing second away from the open space; and
each of the first and second ends of the at least one ferrule is configured to be crimped.

14. A multiaxial receiver, comprising:
a body having a U-shaped cavity configured to receive a longitudinal rod therein and a lower cavity configured to couple to a pedicle screw, the body extending in a vertical direction along a longitudinal axis and extending in a horizontal direction along a widthwise axis;
a first aperture extending through a side surface of the body and defining a first passageway configured to permit a tether to pass therethrough in the horizontal direction;
a second aperture extending through the side surface of the body and defining a second passageway configured to permit the tether to pass therethrough in the horizontal direction;
a threaded aperture extending through an upper surface of the body and into the first passageway and the second passageway; and
a set screw disposed in the threaded aperture,
wherein the set screw is configured to be rotated from an open position in which the tether is permitted to pass through the first passageway and optionally through the second passageway to a closed position in which the tether is immobilized within the first passageway and/or the second passageway;
wherein the set screw includes a flattened bottom surface, and a medial portion of the first passageway and a medial portion of the second passageway share a common cavity having a flattened bearing surface;
wherein the flattened bearing surface comprises a circular indentation having a size and shape corresponding to a size and shape of the flattened bottom surface of the set screw.

15. The multiaxial receiver of claim 14, wherein the lower cavity is configured to mate to a head of the pedicle screw that permits the multiaxial receiver to be angled with respect to an extension direction of the pedicle screw.

16. The multiaxial receiver of claim 14, further comprising:
the at least one tether;
the pedicle screw; and
the longitudinal rod,
wherein the pedicle screw, the body, and the longitudinal rod are configured to be tightened before the set screw is configured to be rotated to the closed position in which the tether is immobilized within the first passageway and/or the second passageway.

* * * * *